United States Patent [19]
Gaulier

[11] 3,771,262
[45] Nov. 13, 1973

[54] GATE AND BRAKING APPARATUS THEREFOR

[75] Inventor: Jean-Claude Gaulier, New York, N.Y.

[73] Assignee: Compteurs Schlumberger, Montrouge, France

[22] Filed: Feb. 17, 1972

[21] Appl. No.: 227,067

[30] Foreign Application Priority Data
Feb. 22, 1971 France.............................. 7105946

[52] U.S. Cl. ....................................... 49/43, 49/46
[51] Int. Cl. ............................................ E05d 15/12
[58] Field of Search ........................... 49/35, 42–46, 49/49; 188/180

[56] References Cited
UNITED STATES PATENTS

| | | | |
|---|---|---|---|
| 1,365,895 | 1/1921 | Dixon ..................................... | 49/46 |
| 3,397,486 | 8/1968 | Foxwell et al. ...................... | 49/35 X |
| 3,525,176 | 8/1970 | Collins.................................. | 49/46 |

FOREIGN PATENTS OR APPLICATIONS

| | | | |
|---|---|---|---|
| 776,895 | 6/1957 | Great Britain.......................... | 49/46 |

*Primary Examiner*—J. Karl Bell
*Attorney*—William R. Sherman et al.

[57] ABSTRACT

A gate for closing a corridor is provided, the gate having driving means and means to terminate its motion if an opposing force is applied while the gate is being closed. The gate is mounted on a fixed axis and the apparatus rotates about a fixed hub. The driving force to close the gate is applied to a rotatable member which rotates about the axis of the hub and which is coupled to a second rotating member through a lost motion coupling and a spring, which spring transmits the driving force. The second rotating member carries and rotates the gate. If a force is applied to the gate in a direction which would oppose the closing motion, and which is of sufficient magnitude, the spring extends and the lost motion coupling permits relative movement between the first and second members. A plurality of fingers carried by the first member are then moved an amount sufficient to permit a locking apparatus to engage the hub and the second member, preventing further rotary motion between these members until the force is removed and the spring recovers the motion in the lost motion coupling. The locking device disclosed includes a plurality of surfaces formed on the second member, which surfaces slope toward the hub and form, with corresponding surface portions on the hub, converging channels. A plurality of rollers are disposed in the large ends of these channels, the rollers being urged toward the small ends of the converging channels by springs. During normal rotation, a plurality of fingers carried by the first member keep the rollers out of contact with the hub, but when the spring in the lost motion coupling is extended and the first member moves relative to the second, the fingers move away from the rollers, allowing their respective springs to urge them into contact with the walls of the converging channls, thereby locking the hub and second member together.

6 Claims, 4 Drawing Figures

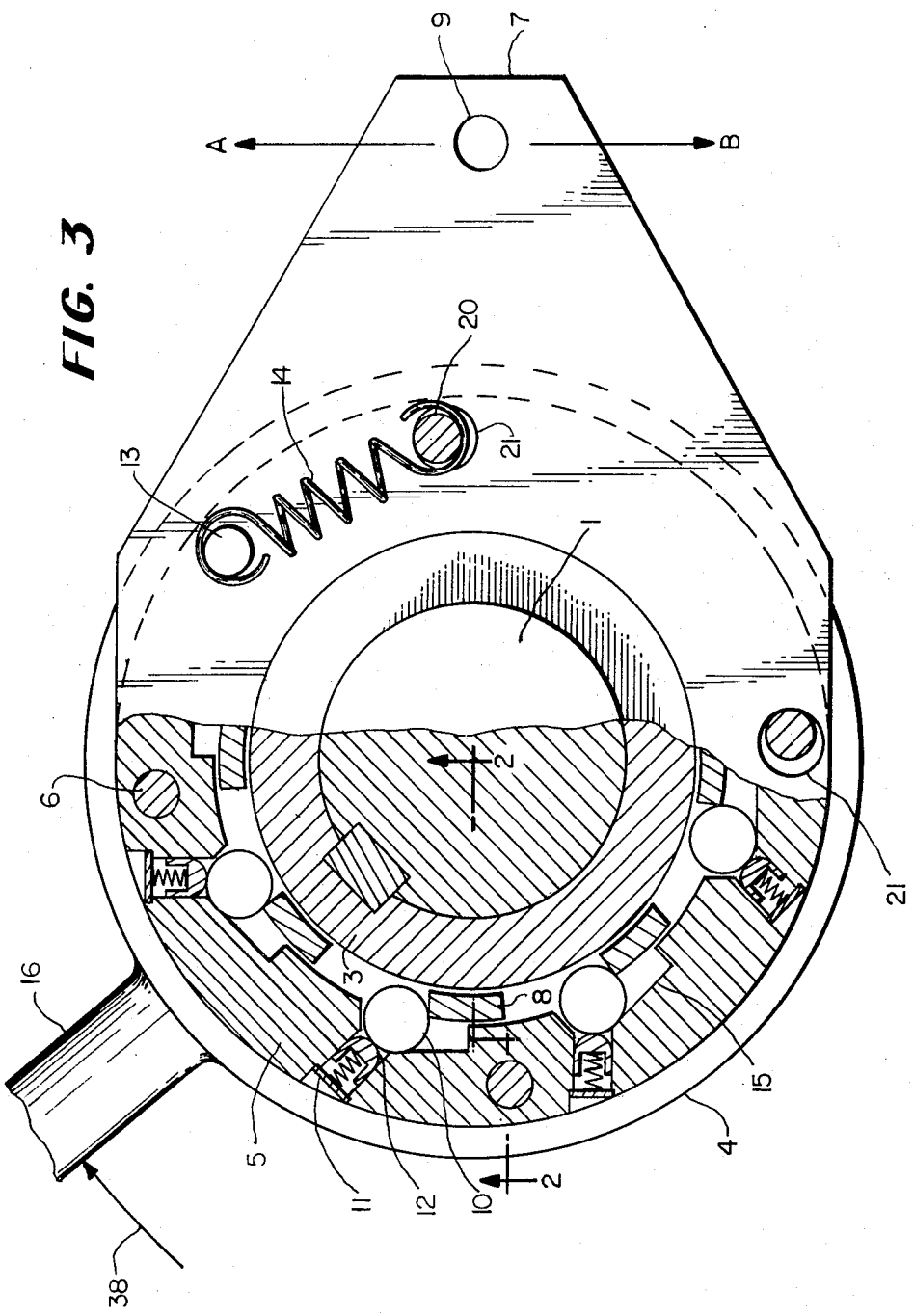

GATE AND BRAKING APPARATUS THEREFOR

This invention relates to a nonreturn device for the control of an alternate rotating movement, and more particularly, for locking the movement of a gate which is being closed to limit access of persons through a corridor or passageway.

The general environment for which this invention was developed is that of a public transportation system such as a subway, or for any similar situation in which one or more corridors are provided to give access to a restricted region upon presentation of a ticket, coin or other token. The prior art includes an access corridor, a gate placed at the exit end of the corridor so that the corridor can be closed off, a control system for opening and closing the gate, and a monitoring system which activates the control system. The gate is normally open to allow the passage of users, and is closed if the entrance ticket presented is not valid or for any other predetermined irregularity. A passageway of this general type is described in French Pat. No. 2,029,911, filed on Jan. 31, 1969, in the name of Compagnil des Compteurs.

It has become apparent that in such installations it can be desirable to equip the system controlling the alternating rotations of the gate arm between open and closed positions with a nonreturn device to prevent any improper attempt to oppose the closing of the gate arm such as by pushing it toward its open position.

Accordingly, it is an object of the present invention to provide a system for braking a gate in the event of a force opposing closure of the gate, the system employing simple and effective mechanical means.

A further object is to provide a nonreturn or braking device for the control of a gate which is rotatably movable in alternate directions, in particular for automatically monitored passageways.

Broadly described, the invention includes a gate mounted for rotation about an axis between an open position and a closed position, a stationary shaft mounted on the axis, means for driving the gate from the open toward the closed position, and means responsive to the application of an opposing force to said gate for braking or locking the gate against further rotary motion with respect to the fixed shaft in either direction until the force is removed.

In order that the manner in which the foregoing and other objects are attained in accordance with the invention can be understood in detail, a particularly advantageous embodiment thereof will be described with reference to the accompanying drawings, which form a part of this specification, and wherein:

FIG. 3 is a plan view, partially in section along lines 3—3 of FIG. 2, of the apparatus of FIG. 2;

Figure 1:
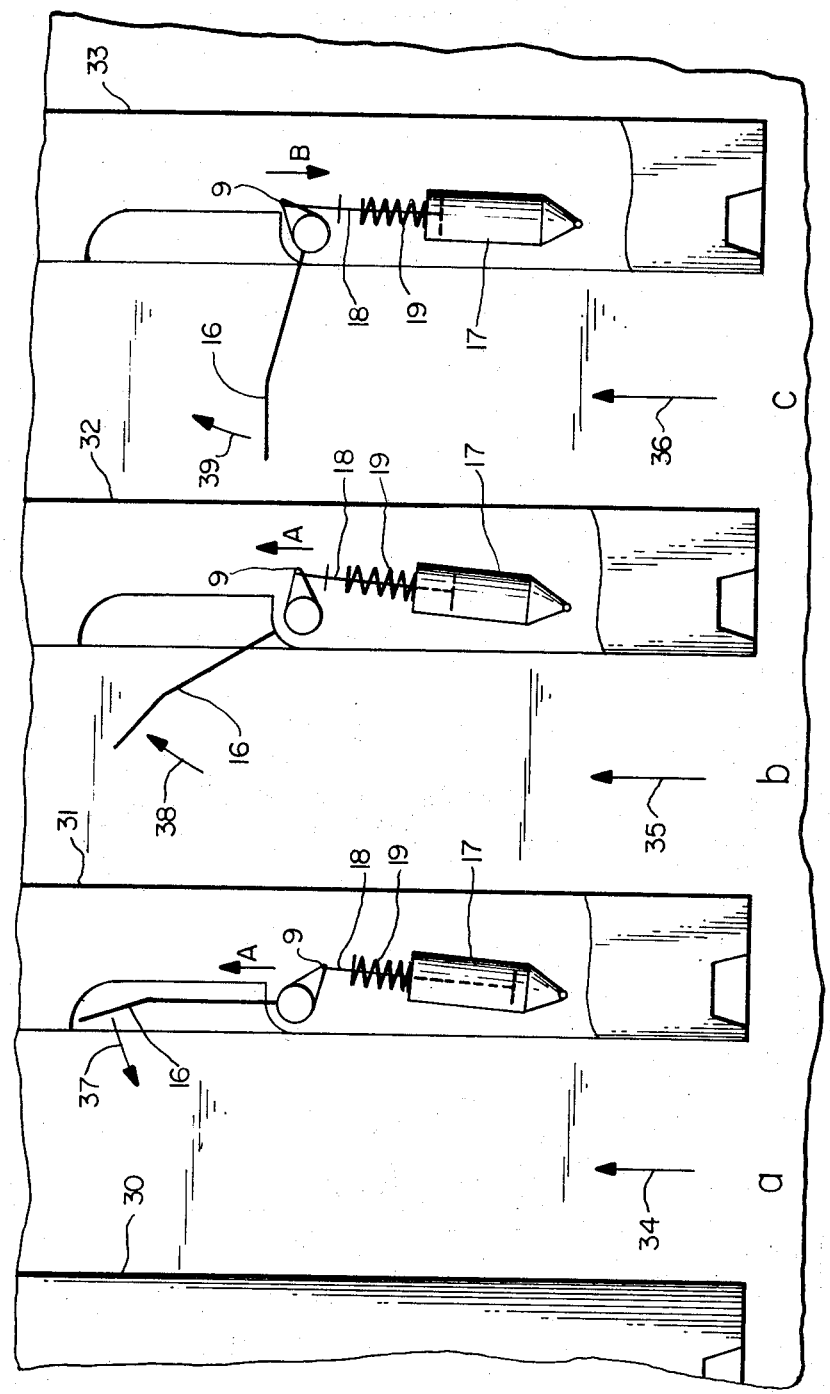
FIG. 1 is a plan view of a system including three passageways, each being provided with a gate in accordance with the present invention.

Before describing the mechanical details of the specific embodiment disclosed herein, it will be helpful to refer to FIG. 1 in which three gate mechanisms are shown in three different circumstances. Three passageways, identified as a, b and c, are formed by four piers or divider structures 30, 31, 32 and 33. These can be either dummy dividers, such as 30, which need not contain any specific apparatus but are simply to guide and restrain individuals passing through the area; or they can contain the gate and drive mechanisms as shown. In each case, it is intended that passengers or users of the system will enter the corridors in the direction of arrows 34, 35 and 36 and that the location of the arrows is in the entrance end of each corridor, the gates each being located near the exit ends of their respective corridors.

In each of dividers 31, 32 and 33, is provided a gate 16 which normally moves in the direction of the arrow 37 when a driving rotating force is applied thereto by a pneumatic or hydraulic drive mechanism including a cylinder and piston schematically illustrated at 17, which piston drives a shaft 18 which is pivotally connected at 9 to a rotating mechanism, the details of which will be described hereinafter. Drive shaft 18 is surrounded by a spring 19 which is included for the purpose of initially accelerating the gate rapidly toward the closed position whenever necessary.

The necessity to close the gate might arise whenever an individual attempts to pass through the corridor without a valid ticket, for example. The monitoring device, not shown, then gives the order to close the gate, whereupon the apparatus including elements 17–19 provide a force at pivot point 9 in the general direction of arrow A, tending to rapidly close the gate.

If the individual attempting to enter improperly resists the closing force of the gate, attempting to reopen the gate, thus applying an opposing force in the direction indicated by arrow 38, the drive mechanism continues to apply its force A at pivot point 9, but the gate 16 is locked in the position to supporting it had rotated at the time the opposing force was applied, the locking being accomplished by the mechanism to be described hereinafter. Upon release of the opposing force 38, the gate is driven to its closed position, and upon departure of the offending individual, and upon the decision to reopen the corridor, the piston and cylinder mechanism is caused to create a force B, as shown in the apparatus in divider 33, causing the gate to move in the direction of arrow 39 toward its open position. It will be observed that a force resisting the motion of the gate toward its open position is not permitted to have any effect on the locking mechanism.

Figure 2:
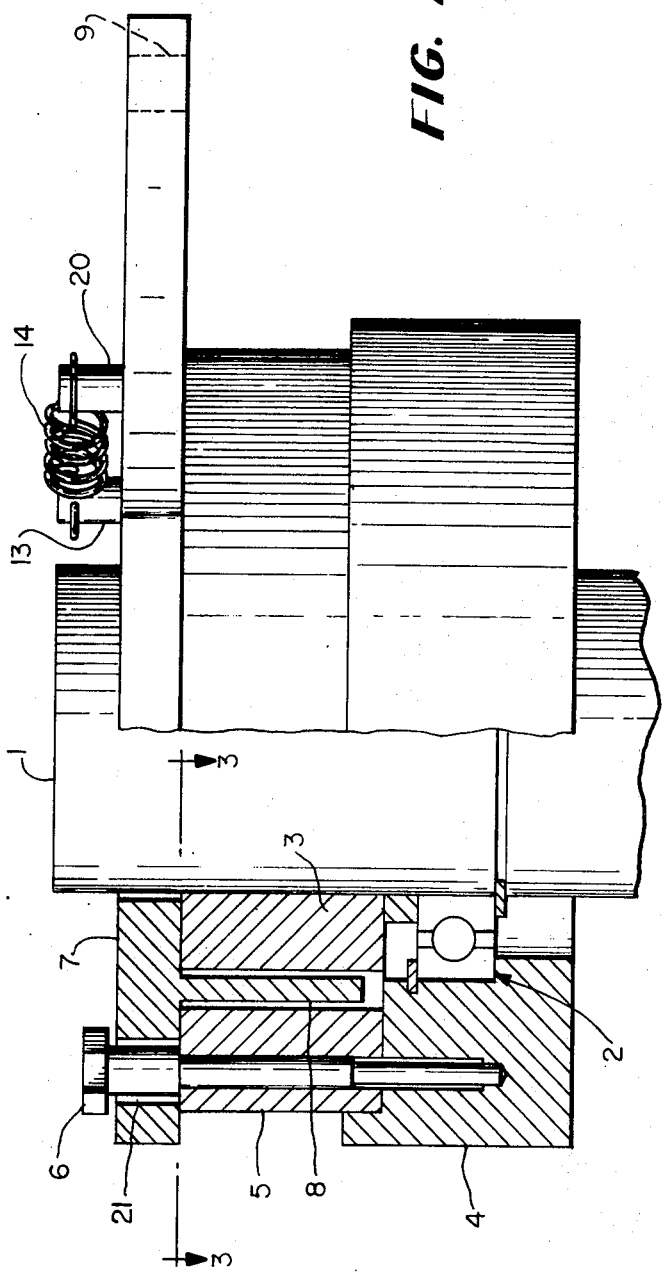
FIG. 2 is a side elevation, in partial section, of a brake apparatus in accordance with the invention.
Figure 4:
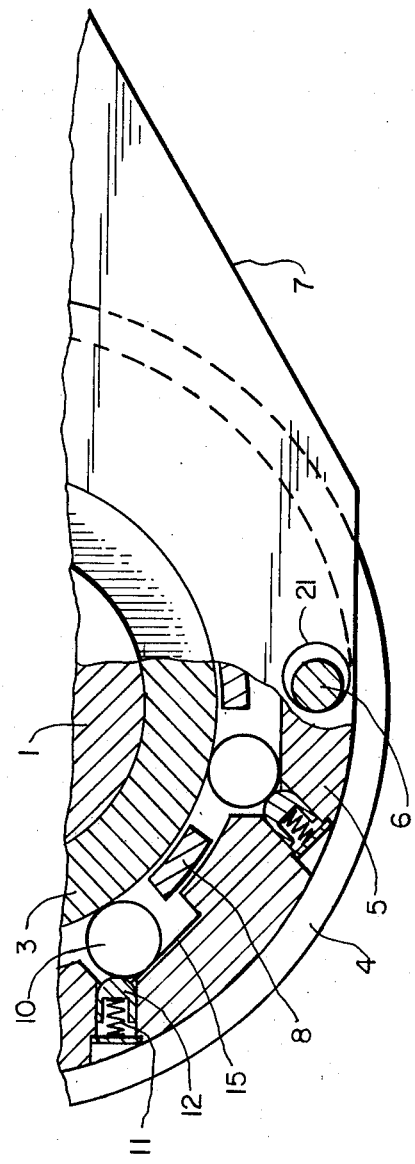
FIG. 4 is a plan view, in partial section, of a segment of the apparatus of FIG. 3 in locked condition.

With this general environmental discussion in mind, attention can now be directed to the details of the device as shown in FIGS. 2–4. In those figures, in which similar reference numerals are used, a fixed vertical shaft 1 is surrounded by a conventional roller bearing structure indicated generally at 2 for rotatably upporting the various components which will rotate about shaft 1. A hub 3 is fixedly attached to shaft 1 by a conventional key-slot arrangement. An annular case 4 surrounds the bearing and is connected to the outer race thereof for rotary movement about the shaft. An annular housing or cage 5 is firmly attached to case 4 by screws 6 which extend upwardly beyond the upper surface of cage 5. A plate 7 lies across the top of cage 5 and is of a larger diameter than the cage. A plurality of fingers 8 extend downwardly from the under surface of plate 7 and lie between cage 5 and hub 3. An opening 9 is provided in plate 7 and constitutes the pivotal connection between the driving means and the gate mechanism as shown in FIG. 1.

As shown in FIG. 2, cage 5 is provided with radial recesses in its inner surface to receive a plurality of rollers 10, which rollers are urged radially inwardly by springs 11 driving thrust members 12. It will be seen that, in the position shown in FIG. 3, the roller motion in the radial inward direction is opposed by fingers 8 which maintain the rollers out of contact with hub 3 and maintain springs 11 in a compressed condition. Inwardly slanting walls 15 form, with the rollers and springs, a locking mechanism having components similar to British Pat. No. 841,721.

Plate 7 is also provided with a pin 13 which protrudes upwardly from the upper surface of plate 7 and which forms an anchor for one end of an extension spring 14. The other end of spring 14 is connected to the upper end of a pin 20 which passes through plate 7 and is attached in cage 5.

It will be observed that pin 20, as well as screws 6, pass through enlarged openings 21, the pins and the enlarged openings forming a lost motion coupling between plate 7 and the assembly comprising cage 5 and housing 4. Spring 14 tends to pull pins 13 and 20 together, urging the lost motion coupling toward one limit of its motion and retaining it at that limit unless a greater opposing force extends the spring.

As shown in FIG. 3, a force applied by the driving mechanism including the piston and cylinder 17 which is in a direction to close the gate is applied at pivot point 9 in the direction of the arrow A, and a force to open the gate is in the direction of the arrow B. The gate itself is indicated at 16 and the existence and direction of a force tending to oppose closing motion of the gate is indicated at 38.

The operation of the apparatus can now be described. It will first be assumed that an unopposed force A is applied to close the gate. The force tends to rotate plate 7 in a counterclockwise direction, as seen in FIG. 3, tending to move plate 7 and pin 13. Spring 14 maintains the distance between pins 13 and 20 essentially constant, pin 20 being connected to the separately rotatable structure including members 4 and 5. Fingers 8 are in the position shown in FIG. 3 so that nothing opposes the rotation of this structure and gate 16, which is connected to case 4, rotates to its closed position.

It will be observed that FIG. 3 would also illustrate the relationship of the components in the event of an opening force B.

However, if the closing force is resisted by a sufficient force 38, this opposing force is transmitted through gate 16, housing 4 and cage 5 to pin 20 which tends to move away from pin 13, extending spring 14. On the assumption that the force is sufficient to extend spring 14, pin 20 will be moved to the other side of enlarged opening 21, or, phrased differently, to the other extreme of the lost motion coupling. This permits relative movement of fingers 8 with respect to cage 5, the fingers being permitted to move to the position shown in FIG. 4. As fingers 8 move away from their associated rollers 10, springs 11 and thrust members 12 push the rollers in the direction of the fingers, the rollers being moved radially and circularly in the direction urged by the spring. It will be seen that the inner surface of cage 5 includes a plurality of surfaces 15 which are not parallel to tangents of the hub along their respective radii but rather converge toward opposite portions of the hub surface. Thus, the surfaces 15 and the radially inwardly spaced outer surfaces of hub 3 tend to form convergent channels which are largest adjacent the dormant position of rollers 10 but which are smallest in the direction toward which fingers 8 are moved when an opposing force is applied. The rollers are selected with dimensions such that they cannot fit in the smallest portions of the converging channels so that each roller is forced into contact with both sides of the channel, causing the apparatus to lock. Relative motion between the hub and cage 5 is therefore terminated and, with pin 20 and pins 6 at the respective opposite extremes of the lost motion, movement of plate 7 is likewise terminated. The apparatus is then incapable of moving in either direction until the locking force is removed or until a force B is applied with sufficient velocity to cause the force in the direction of arrow 38 to become ineffective.

Upon removal of the force 38, the arm continues in its movement to the closed position.

While one advantageous embodiment of the invention has been disclosed in detail, it will be understood by those skilled in the art that various modifications can be made without departing from the scope of the invention as defined in the appended claims.

I claim:

1. A brake device for a gate system comprising the combination of a gate mounted for rotation about an axis in one direction from an open position to a closed position and in the opposite direction from the closed position to the open position thereof; a stationary shaft mounted on said axis; means for driving said gate from said open to said closed position; and means coupled to said shaft and responsive to the application of a force to said gate in opposition to movement toward said closed position for blocking said gate against rotary motion with respect to said shaft caused by such force until removal thereof.

2. Apparatus comprising the combination of a gate; a fixed shaft having an axis; rotatable means carried by said shaft for pivotally supporting said gate for rotation about said axis; means for driving said rotatable means and said gate from an open position to a closed position; brake means responsive to a force resisting motion of said gate from said open to said closed position for locking said rotatable means to said shaft; and means carried by said rotatable means for rendering said brake means inactive until said force exceeds a preselected level.

3. An apparatus according to claim 2 wherein said rotatable means includes a first member mounted for rotation about said axis, said first member being connected to said means for driving; a second member mounted for rotation about said axis, said second member being connected directly to said gate; a lost-motion coupling between said first and second members; and spring means interconnecting said first and second members for holding said members together at one extreme of said lost-motion coupling and for transmitting the driving force from said means for driving to said gate.

4. An apparatus according to claim 3 wherein said means carried by said rotatable means includes a plurality of fingers carried by said first member and extending between said second member and said shaft to interfere with the action of said brake means in the absence of force exceeding said level.

5. An apparatus according to claim 4 wherein said second member is provided with a plurality of surfaces defining, with corresponding portions of said shaft, converging channels between said second member and said shaft; and said brake means includes a plurality of rollers, and a spring associated with each of said rollers, each said spring being disposed to urge its associated roller into braking engagement with the surfaces of said converging channels, said fingers being normally disposed to maintain said rollers out of engagement with at least one of said surfaces.

6. An apparatus according to claim 2 wherein said brake means is inoperative to lock said rotatable means to said shaft in response to a force opposing motion of said gate from said closed to said open position.

* * * * *

UNITED STATES PATENT OFFICE
CERTIFICATE OF CORRECTION

PATENT NO. : 3,771,262
DATED : November 13, 1973
INVENTOR(S) : Jean-Claude Gaulier It is certified that error appears in the above-identified patent and that said Letters Patent are hereby corrected as shown below:

IN THE HEADING:

After the inventor's name, the residence should be -- Bois d'Arcy (Yvelines), France -- rather than "New York, N.Y."

IN THE SPECIFICATION:

Column 1, line 22, "Compagnil" should be -- Companie --.

Column 2, line 33, "supporting" should be -- which --.

Signed and Sealed this sixteenth Day of September 1975

[SEAL]

Attest:

RUTH C. MASON
Attesting Officer

C. MARSHALL DANN
Commissioner of Patents and Trademarks